United States Patent [19]
Starczewski et al.

[11] 3,754,810
[45] Aug. 28, 1973

[54] CONVERTIBLE SUNSHADE AND NON-GLARE VISOR

[76] Inventors: Frank J. Starczewski, 1225 W. 31st Pl., Chicago, Ill. 60608; Robert E. Spychalski, 6214 S. Kilpatric Ave., Chicago, Ill. 60629

[22] Filed: Feb. 15, 1972

[21] Appl. No.: 226,485

[52] U.S. Cl. ............ 350/156, 296/97 F, 350/276 R
[51] Int. Cl. ........................ B60j 11/00, G02b 5/30
[58] Field of Search ........................ 350/156, 276 R; 296/97 F

[56] References Cited
UNITED STATES PATENTS

| | | | |
|---|---|---|---|
| 3,635,543 | 1/1972 | Collins | 350/156 |
| 2,351,797 | 6/1944 | Young | 350/156 |
| 2,359,456 | 10/1944 | Young | 350/156 |
| 3,475,080 | 10/1969 | Shumway | 350/276 R |
| 2,220,429 | 11/1940 | Soderberg | 350/276 R |

FOREIGN PATENTS OR APPLICATIONS

| | | | |
|---|---|---|---|
| 874,913 | 8/1961 | Great Britain | 350/156 |

OTHER PUBLICATIONS

"New Polaroid Anti–Glare Filter for Motorists" The Optician p. 184, Aug. 20, 1965.

*Primary Examiner*—John K. Corbin
*Attorney*—Dominik, Knechtel & Godula

[57] ABSTRACT

A transparent non-glare visor body having a removable, flexible opaque cover, which is is mounted to entirely enclose the visor body when said visor body is not used to protect viewing against glare of sunlight. The non-glare visor body is plastic with safety trim edging along the free edges of the visor body. The flexible cover has safety material to provide cushioning.

6 Claims, 3 Drawing Figures

Patented Aug. 28, 1973
3,754,810
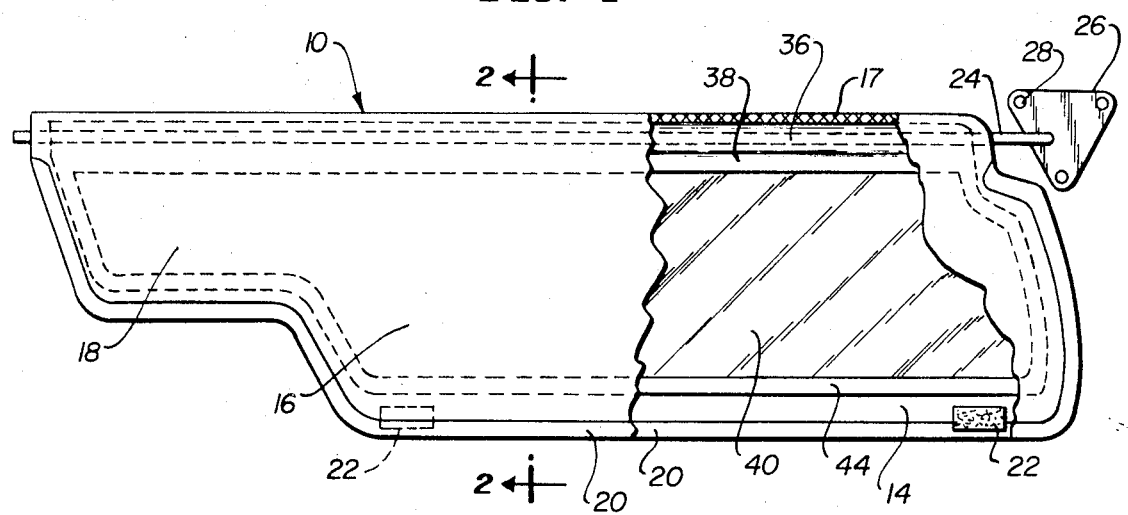
FIG. 1
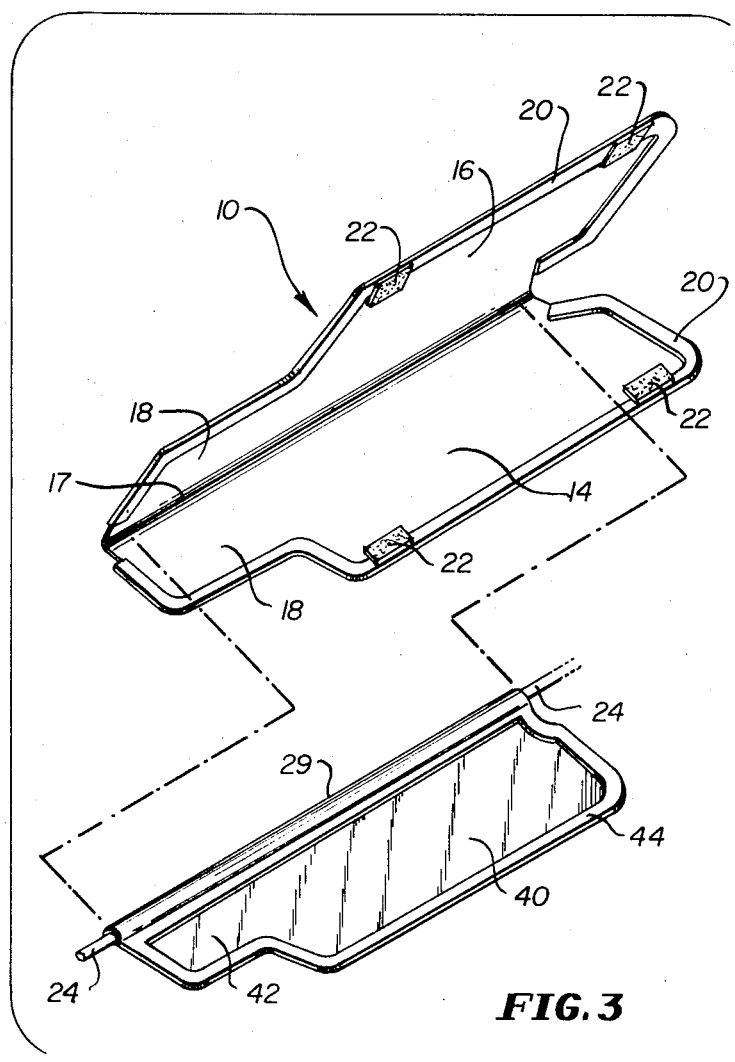
FIG. 2
FIG. 3

CONVERTIBLE SUNSHADE AND NON-GLARE VISOR

This invention relates to an improved sunshade combination having a transparent, non-glare visor body, and a protective flexible cover to enclose the visor body when not used to cut down glare to the user.

Various sunshade assemblies and constructions are known in the art, and there have been some attempts to provide tinted members or areas in the windshield to cut down glare. Tinted areas on windshields, for example, have usually been provided only in a minor area of the windshield so as not to unduly reduce normal vision. In addition, such tinted areas of the windshield have been lightly tinted so as to also not unduly reduce vision of the driver. It is highly desirable to provide the conventionally positioned sunshade with means which effectively cut down glare in the manner of polarizing tinted sunglasses, while still providing conventional use of the sunshade as such.

It is accordingly one important object of the present invention to provide a new visor assembly which can operate as a conventional sunshade, and which can be converted to effective use for glare reduction similar to conventional sun glasses.

It is yet another important object of the present invention to provide a convertible visor assembly in which a soft, protective cover entirely encloses a pivotally mounted visor body tinted effectively to function like polarizing tinted sun glasses when pivoted downwardly to intercept the user's line of vision.

The above objects are attained together with still other objects which will occur to practitioners by the invention shown in the following disclosure, including drawings wherein:

FIG. 1 is a side elevational view of a convertible visor assembly;

FIG. 2 is a sectional view along lines 2—2 of FIG. 1 on an enlarged scale; and

FIG. 3 is an exploded perspective showing the cover removed from the transparent, non-glare visor body.

Use of the same numerals in the various views of the drawings will indicate a reference to the same structures, parts or elements, as the case may be.

The convertible visor assembly provides a flexible cover which encloses a transparent, non-glare visor body, said cover being removable so that the visor body may be pivoted into position to reduce glare in the vision of the user. The flexible cover is preferably of a material which cushions any impact with a driver or passenger in a vehicle.

Referring now to the drawings, there is shown a flexible, opaque cover, generally as 10. The cover has two parts, namely, a rear flap 14 and an opposed front flap 16 separated along a fold 17, somewhat rounded.

One end of the cover has a reduced height area 18, and the free edges of the cover are substantially covered by edging material 20. The cover is preferably made of soft cushioning material, which may include a layer of foam rubber, not shown. The purpose of the cover is to operate as a protective covering for the substantially rigid plastic visor body enclosed therein. The cover body is intended to entirely close the body by securing the flaps to each other. Means for securing such flaps are shown as Velcro patches 22 spaced in face-to-face alignment along opposed edging portions 20. Velcro is a trademark for well-known plastic hook and loop fasteners. The Velcro material allows the flaps to be separable held together by mating and unmating the aligned Velcro patches in the usual way.

The convertible visor assembly includes an elongated support such as support rod 24, which has a mounting plate 26 at one end of the visor assembly. The mounting plate 26 is attached to the interior of the vehicle in the usual way by employing fasteners 28. The mounting plate is positioned to a side of the vehicle above the windshield so that the convertible visor assembly can be positioned in the conventional place for conventional use.

The support rod 24 is received by a tubular pivot member shown generally as 29. Such a tubular member is substantially rigid, at least in part, so that it may freely pivot around support rod 24. Looking now at FIG. 2, the tubular pivot member is shown as including an inner wrap member 30 which is substantially rigid. The wrap member has a short side 30 terminating substantially at the bottom of the rod, and the long side 34 which extends below the rod. An outer tubular wrap 36 has a pair of attaching legs 38 which may be fastened in various ways to the planar, tinted and transparent non-glare plastic visor body 40. Wrap 36 is preferably flexible and bonded to inner wrap member 30.

The planar visor body has the general configuration of the cover member, including reduced height area 42 at the end of the visor body opposite the end which adjoins the mountin bracket plate 26. The reduced area represents a nonfunctional viewing, and accommodates space limitations inside the vehicle, in the usual way.

The free edges of the visor body, that is, the edges other than the edge adjoining the tubular pivot 29, are covered with safety trim edging such as vinyl plastic. Such free edges are shown as the opposite side and bottom edges. The safety edge trimming is preferably in the configuration of a channel, having a base substantially thicker than the visor body edging. The channel configuration may be seen in the section view of FIG. 2, and such channel strip may be frictionally mounted with or without bonding material.

The visor body is preferably tinted so it functions similarly to polarizing sun glasses. This very effectively cuts down the glare in the same manner as sun glasses. The user simply removes the cover and pivots the visor body down to its functional position to intercept his vision. In the preferred embodiment, the cover entirely enfolds or encloses the visor body, and the fastening means, such as Velcro patches 22, fasten the flaps of the cover below the free bottom edge of the visor body.

The invention is now defined by terms in the form of the following claims which may be further understood by reference to the foregoing description and drawings.

What is claimed is:

1. A convertible assembly, including
a substantially planar transparent and non-glare plastic visor body,
an elongated support rod, means at one end of said support rod to attach the rod to the interior of a vehicle,
a tubular pivotal member to secure the support rod to the top of the visor body,
a flexible sunshade cover formed from soft, cushioning material, and having two parts to entirely cover the opposite sides of the visor body, and
means to releasably secure the two parts of the sunshade cover together, so that said sunshade cover may be mounted in place and totally removed when the visor body is positioned for use.

2. A visor assembly as in claim 1 wherein the plastic visor body is polarizing tinted plastic.

3. A visor assembly as in claim 2 wherein the plastic visor body has free side and bottom edges, and a thicker safety trim edging covering said free edges.

4. A visor assembly as in claim 3 wherein said safety trim edging is a plastic channel strip mounted to cover the free edges.

5. A visor assembly as in claim 1 wherein the means to releasably hold the two parts together are plastic hook and loop fastener areas aligned inside said two parts below the bottom free edge of the visor body.

6. A visor assembly as in claim 1 wherein said sunshade cover has a rear and front flap joined to a fold, and wherein said sunshade cover freely enfolds said visor body to completely enclose same.

* * * * *